United States Patent
Gupta et al.

(10) Patent No.: US 11,091,681 B2
(45) Date of Patent: Aug. 17, 2021

(54) METHODS OF MAKING AND USING A SUPERABSORBENT POLYMER FLUID

(71) Applicant: Halliburton Energy Services, Inc., Houston, TX (US)

(72) Inventors: Nivika Rajendra Gupta, Pune (IN); Edwin Gnanakumar Solomon Raja, Pune (IN); Jay Paul Deville, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 133 days.

(21) Appl. No.: 16/670,610

(22) Filed: Oct. 31, 2019

(65) Prior Publication Data

US 2021/0130673 A1    May 6, 2021

(51) Int. Cl.
| | |
|---|---|
| *C09K 8/035* | (2006.01) |
| *C09K 8/92* | (2006.01) |
| *C09K 8/516* | (2006.01) |
| *E21B 21/00* | (2006.01) |
| *C08L 5/00* | (2006.01) |

(52) U.S. Cl.
CPC .............. *C09K 8/035* (2013.01); *C09K 8/516* (2013.01); *C09K 8/92* (2013.01); *C08L 5/00* (2013.01); *E21B 21/003* (2013.01)

(58) Field of Classification Search
None
See application file for complete search history.

(56) References Cited

U.S. PATENT DOCUMENTS

| | | | |
|---|---|---|---|
| 6,455,600 B1 * | 9/2002 | Hahnle | A61L 15/425 521/63 |
| 6,750,262 B1 * | 6/2004 | Hahnle | A61L 15/24 521/64 |
| 7,131,492 B2 | 11/2006 | Kriegel | |
| 2005/0080182 A1 * | 4/2005 | Ahmed | C08J 3/03 524/458 |

(Continued)

OTHER PUBLICATIONS

Foreign Communication from Related Application—International Search Report and Written Opinion of the International Searching Authority, International Application PCT/US2019/061934, dated Jul. 29, 2020, 15 pages.

(Continued)

*Primary Examiner* — John J Figueroa
(74) *Attorney, Agent, or Firm* — Conley Rose, P.C.; Rodney B. Carroll

(57) ABSTRACT

A method of treating a subterranean formation penetrated by a wellbore, wherein the subterranean formation comprises one or more permeable zones, comprising introducing a superabsorbent polymer (SAP) fluid into the wellbore, wherein the SAP fluid comprises an aqueous fluid and an SAP material comprising a reaction product of a reaction mixture comprising one or more viscosifying polymeric materials, one or more crosslinking agents, and water, allowing the SAP fluid to flow into at least a portion of the one or more permeable zones in the subterranean formation, and allowing the SAP material to absorb water and form a swollen SAP material, wherein the swollen SAP material impedes fluid flow through at least a portion of the one or more permeable zones.

23 Claims, 6 Drawing Sheets

(56) References Cited

U.S. PATENT DOCUMENTS

| | | | |
|---|---|---|---|
| 2006/0081369 A1* | 4/2006 | Kriegel | C09K 8/685 |
| | | | 166/278 |
| 2009/0264322 A1 | 10/2009 | Morris et al. | |
| 2011/0036583 A1* | 2/2011 | Willberg | E21B 43/26 |
| | | | 166/308.1 |
| 2011/0237468 A1* | 9/2011 | Reichenbach-Klinke | |
| | | | C09K 8/5083 |
| | | | 507/226 |
| 2013/0256033 A1 | 10/2013 | Gleitman | |
| 2014/0309147 A1 | 10/2014 | Parris | |
| 2015/0096751 A1 | 4/2015 | Shen et al. | |
| 2016/0289541 A1* | 10/2016 | Zhou | C09K 8/90 |
| 2016/0369153 A1 | 12/2016 | Ali et al. | |
| 2018/0306006 A1 | 10/2018 | Gupta et al. | |

OTHER PUBLICATIONS

Anbergen, U., et al., "Elasticity and swelling behaviour of chemically crosslinked cellulose ethers in aqueous systems," Polymer, Oct. 1990, pp. 1854-1858, vol. 31, Butterworth-Heinemann Ltd.
Demitri, Christian, et al., "Novel Superabsorbent Cellulose-Based Hydrogels Crosslinked with Citric Acid," Journal of Applied Polymer Science, 2008, pp. 2453-2460, vol. 110, Wiley Periodicals, Inc.
Gupta, Nivika Rajendra, Synthesis and Characterization of Superabsorbent Polymers [SAPs] based on Polysaccharides, Chapter V, pp. 121-148.

* cited by examiner

METHODS OF MAKING AND USING A SUPERABSORBENT POLYMER FLUID

BACKGROUND

This disclosure relates to methods of making and using a wellbore servicing fluid in a wellbore experiencing water and/or gas influx or lost circulation. More specifically, it relates to methods of making and introducing compositions into a wellbore penetrating a subterranean formation to reduce water and/or gas influx from the formation into the wellbore or reduce the loss of fluid from the wellbore to the formation.

A natural resource such as hydrocarbons residing in a subterranean formation can be recovered by drilling a well into the formation. In various scenarios, fluid in a wellbore may communicate with fluid in the subterranean formation around the wellbore. It is well known that wellbores pass through a number of zones within a subterranean formation other than the particular hydrocarbon zones of interest. Some of these zones may be water producing, gas producing, or both. In one scenario, undesired water production, gas production, or both can affect the economic life of hydrocarbon producing wells and can potentially induce other types of problems, such as sand production, scale, and corrosion of tubulars. It may be desirable to prevent water and/or gas from such zones from being produced with commercially desirable hydrocarbons. One of the most common methods of eliminating, or at least slowing, water and/or gas production is to introduce water/gas shut off fluids into one or more zones with in the wellbore and surrounding formation. After identification of the offending zone(s), water/gas shut off fluids can be pumped into place and allowed to form a physical barrier to impede the in-flow of water and/or gas into the wellbore.

In another scenario, fluids used in servicing a wellbore may be lost to the subterranean formation while circulating the fluids in the wellbore. In particular, the fluids may enter the subterranean formation via lost circulation zones, for example, depleted zones, zones of relatively low pressure, zones having naturally occurring fractures, weak zones having fracture gradients exceeded by the hydrostatic pressure of the wellbore servicing fluid (e.g., drilling fluid), and so forth. As a result, the service provided by such wellbore servicing fluid is more difficult to achieve. For example, a drilling fluid may be lost to the formation, resulting in the circulation of the fluid in the wellbore being too low to allow for further drilling of the wellbore. Also, a secondary cement/sealant composition may be lost to the formation as it is being placed in the wellbore, thereby rendering the secondary operation ineffective in maintaining isolation of the formation. A lost circulation material is often introduced into the lost circulation zone to reduce and eventually prevent the flow of servicing fluids into the lost circulation zone including, for example, a weak, fractured, or vugular formation.

Accordingly, an ongoing need exists for methods of blocking the fluid communication between a wellbore and the surrounding subterranean formations, e.g., the flow of water and/or gas influx and the outflow of fluid from the wellbore through lost circulation zones into a surrounding subterranean formation.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
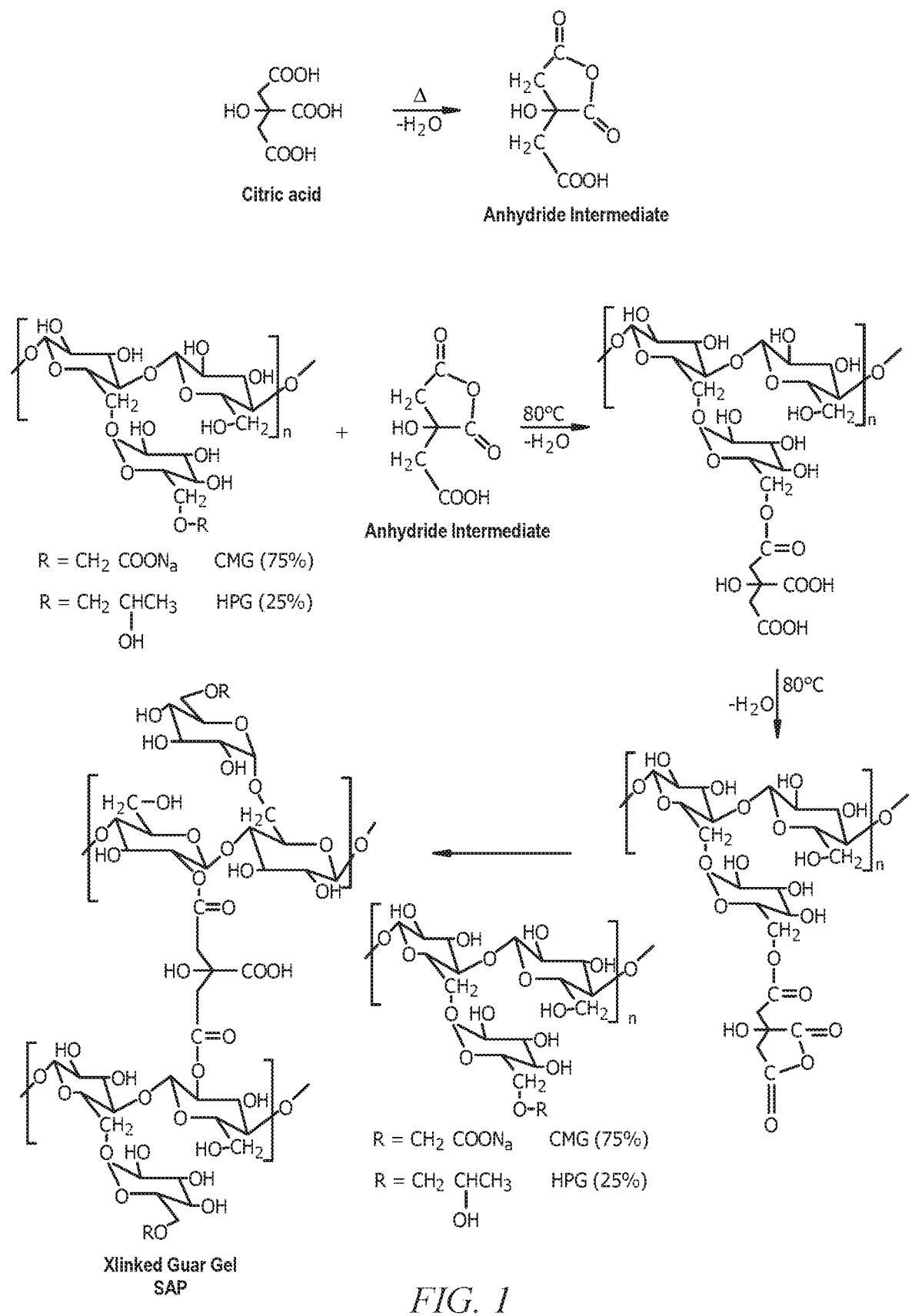
FIG. 1 shows the mechanisms of crosslinking of CMG: HPG blends with citric acid (CA).

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

It is to be understood that "subterranean formation" encompasses both areas below exposed earth and areas below earth covered by water such as ocean or fresh water.

A superabsorbent polymer (SAP) material is a polymeric material that can absorb and retain extremely large amounts of a liquid relative to its own weight. For example, and without limitation, an SAP material can absorb liquid (e.g., an aqueous fluid) of at least 5, 10, 20, 30, 40, 50, 60, 70, 80, 90, 100, 125, 150, 175, 200, 225, 250, 275, 300, or greater times of its own weight.

Disclosed herein is a method of treating a subterranean formation penetrated by a wellbore, wherein the subterranean formation includes one or more permeable zones, including: introducing a superabsorbent polymer (SAP) fluid into the wellbore, wherein the SAP fluid includes an aqueous fluid and an SAP material including a reaction product of a reaction mixture including one or more viscosifying polymeric materials, one or more crosslinking agents, and water; allowing the SAP fluid to flow into at least a portion of the one or more permeable zones in the subterranean formation; and allowing the SAP material to absorb water and form a swollen SAP material, wherein the swollen SAP material impedes fluid flow through at least a portion of the one or more permeable zones. The reaction of the reaction mixture to produce the reaction product (e.g., the SAP) will be discussed in more detail herein.

The reaction mixture used to make the SAP material can include one or more viscosifying polymeric materials. The one or more viscosifying polymeric materials can include one or more polysaccharides. The one or more polysaccharides can be independently selected from cellulose (hydroxyethyl cellulose, hydroxyl propyl cellulose, carboxymethyl cellulose, carboxymethyl hydroxyl propyl cellulose, etc.), starch (carboxymethyl starch and derivatives thereof), guar (hydroxyethyl guar, hydroxyl propyl guar, hydroxypropyl guar (HPG), carboxymethyl guar (CMG), carboxymethyl hydroxyl propyl guar, etc.), tamarind (hydroxyethyl tamarind, hydroxyl propyl tamarind, carboxymethyl tamarind, carboxymethyl hydroxyl propyl tamarind, etc.), carrageenan and derivatives thereof, sodium alginate and derivatives thereof, chitin and derivatives thereof, and combinations thereof. In one or more specific embodiments, the one or more polysaccharides can include carboxymethyl guar (CMG), hydroxypropyl guar (HPG), or a combination thereof.

In embodiments, the one or more viscosifying polymeric materials can be independently selected from polyvinyl alcohol and derivatives thereof, polyaspartic acid and derivatives thereof, polyacrylic acid and derivatives thereof, and combinations thereof. The one or more viscosifying polymeric materials can be independently selected from locust bean gum, Karaya gum, gum tragacanth, hydrophobically modified guars, high-molecular weight polysaccharides composed of mannose and galactose sugars, heteropolysaccharides obtained by the fermentation of starch-derived sugars, xanthan, pectins, diutan, welan, gellan, scleroglucan, chitosan, dextran, substituted or unsubstituted galactomannans, starch, cellulose, cellulose ethers, carboxycelluloses, hydroxypropyl cellulose, carboxyalkylhydroxyethyl celluloses, carboxymethyl hydroxyethyl cellulose, methyl cellulose, sodium polyacrylate, polyacrylamide, partially hydrolyzed polyacrylamide, polymethacrylamide, poly(acrylamido-2-methyl-propane sulfonate), poly(sodium-2-acrylamide-3-propylsulfonate), copolymers of acrylamide and acrylamido-2-methyl-propane sulfonate, terpolymers of acrylamido-2-methyl-propane sulfonate, acrylamide and vinylpyrrolidone or itaconic acid, derivatives thereof, and the like, and combinations thereof.

The one or more polysaccharides can include CMG and HPG, and the ratio of CMG to HPG in the reaction mixture can be from about 1:1 to about 4:1 on weight basis, alternatively from about 2:1 to about 4:1, alternatively from about 2.8:1 to about 3.2:1, alternatively about 3:1. The ratio of one viscosifying polymeric material to another viscosifying polymeric material in the reaction mixture can be from about 1:1 to about 4:1 on weight basis, alternatively from about 2:1 to about 4:1, alternatively from about 2.8:1 to about 3.2:1. The HPG can aid in promoting intermolecular crosslinking rather than intramolecular crosslinking. This can be caused by a combination of the propyl group chain length of the HPG that helps in the crosslinking along with the carboxylate group from the CMG that helps in charge-charge repulsion. The one or more viscosifying polymeric materials can have a molecular weight in a range of equal to or greater than 1.2 MM Da to equal to or less than 5 MM Da, alternatively in a range of equal to or greater than 1.5 MM Da to equal to or less than 5 MM Da, alternatively in a range of equal to or greater than 1.7 MM Da to equal to or less than 5 MM Da, which can be measured by Gel Permeation chromatography (GPC). The one or more viscosifying polymeric materials can be present in the reaction mixture in an amount of from about 1 wt. % to about 5 wt. %, based on the total weight of the reaction mixture, alternatively from about 1.5 wt. % to about 4 wt. %, alternatively from about 2 wt. % to about 3 wt. %.

The reaction mixture used to make the SAP material can include one or more crosslinking agents. The one or more crosslinking agents can be independently selected from citric acid (CA), divinyl sulphone (DVS), carbodiimide, glutraldehyde, epichlorohydrin, succinic acid, succinic anhydrides, and combinations thereof. The one or more crosslinking agents can be independently selected from one or more compounds that can be described by the formula of Structure I:

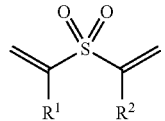

Structure I wherein $R^1$ includes a hydrogen or a hydrocarbon group having from about 1 to about 30 carbon atoms, $R^2$ includes a hydrogen or a hydrocarbon group having from about 1 to about 30 carbon atoms, and $R^1$ and $R^2$ do not include a hydroxyl group.

In one or more specific embodiments, the one or more crosslinking agents are independently selected from citric acid (CA), divinyl sulphone (DVS), and combinations thereof. The one or more crosslinking agents can be present in the reaction mixture in an amount of from about 0.001 wt. % to about 10 wt. %, based on the total weight of the reaction mixture, alternatively from about 2 wt. % to about 8 wt. %, alternatively from about 4 wt. % to about 6 wt. %. The ratio of the one or more crosslinking agents to the one or more viscosifying polymeric materials in the reaction mixture can be from about 0.5:1 to about 5:1 on weight basis, alternatively from about 0.7:1 to about 4.5:1, alternatively from about 1:1 to about 4:1.

The SAP fluid includes an aqueous fluid and the reaction mixture includes water. The aqueous fluid in the SAP fluid and the water in the reaction mixture can include water selected from a group consisting of freshwater, seawater, saltwater, brine (e.g., natural brine, formulated brine, etc.), and combinations thereof. The formulated brine may be produced by dissolving one or more soluble salts in water, a natural brine, or seawater. Representative soluble salts include the chloride, bromide, acetate, and formate salts of potassium, sodium, calcium, magnesium, and zinc. Generally, the water may be from any source, provided that it does not contain an amount of components that may undesirably affect the other components in the SAP fluid or the reaction mixture. The aqueous fluid in the SAP fluid can be salt water or brine including the chloride, bromide, acetate, and formate salts of potassium, sodium, calcium, magnesium, and zinc, or combinations thereof. The salt can be present in an amount of from about 0.5 wt. % to about 30 wt. % based on the total weight of the salt water or brine, alternatively from about 5 wt. % to about 25 wt. %, alternatively from about 10 wt. % to about 20 wt. %. The aqueous fluid can be present in the SAP fluid in an amount sufficient to form a pumpable fluid or slurry capable of being placed (e.g., pumped) into the wellbore. The aqueous fluid can be present in the SAP fluid in an amount effective to provide a pumpable fluid or slurry having desired (e.g., job or service specific) rheological properties such as density, viscosity, gel strength, yield point, etc. The aqueous fluid can be present in the SAP fluid in an amount of from about 10 wt. % to about 50 wt. % based on the total weight of the SAP fluid, alternatively from about 10 wt. % to about 40 wt. %, alternatively from about 10 wt.

% to about 30 wt. %. The water can be present in the reaction mixture in an amount of from about 70 wt. % to about 99 wt. % based on the total weight of the reaction mixture, alternatively from about 75 wt. % to about 95 wt. %, alternatively from about 80 wt. % to about 90 wt. %.

In one or more specific embodiments, the one or more viscosifying polymeric materials include carboxymethyl guar (CMG) and hydroxypropyl guar (HPG) and the one or more crosslinking agents include citric acid (CA), and the SAP material can be referred to herein as CMG:HPG-CA, which can be a solid particulate material (e.g., a dehydrated crystalline form). In one or more specific embodiments, the one or more viscosifying polymeric materials include carboxymethyl guar (CMG) and hydroxypropyl guar (HPG) and the one or more crosslinking agents include divinyl sulphone (DVS), and the SAP material can be referred to herein as CMG:HPG-DVS, which can be a solid particulate material (e.g., a dehydrated crystalline form). The SAP material can include CMG:HPG-CA, CMG:HPG-DVS, or both.

The SAP material includes a reaction product from a reaction mixture, wherein the reaction mixture further includes a pH adjuster. Suitable pH adjusters are those compounds that will adjust and/or maintain the pH of the reaction mixture at a desired level without introducing potentially problematic ions. Suitable pH adjusters include, but are not limited to, hydroxides, phosphates, carbonates, bicarbonates, borates, derivatives thereof, or combinations thereof. The pH adjusters can be the phosphate, carbonate, and bicarbonate varieties. Certain pH adjusters will have the ability to maintain the pH of the reaction mixture at a desired level. For instance, phosphate and borate pH adjusters may be able to maintain the pH of the reaction mixture at a desired level. In embodiments, borates may act as buffers but may also crosslink with the one or more viscosifying polymeric materials or the one or more crosslinking agents, which may be problematic or desirable, depending on the circumstances. If a chosen borate does not interact with the chosen viscosifying polymeric materials or the chosen crosslinking agents and such interaction is not desirable, then that borate may be a suitable pH adjuster. The pH adjuster should be included in the reaction mixture in an amount sufficient to adjust and/or maintain the pH at a desired level. The pH adjuster can be present in the reaction mixture in an amount of from about 0.05 wt. % to about 2 wt. % based on the total weight of the reaction mixture. The pH adjuster can be present in an amount effective to provide the reaction mixture with a pH of equal to or greater than 7.

The SAP material includes a reaction product from a reaction mixture, wherein the reaction mixture further includes a catalyst. The catalyst can include potassium hydroxide (KOH). The catalyst can be present in the reaction mixture in an amount of from about 0.0005 wt. % to about 0.01 wt. %, based on the total weight of the reaction mixture, alternatively from about 0.001 wt. % to about 0.005 wt. %.

The components of the reaction mixture (e.g., the one or more viscosifying polymeric materials and the one or more crosslinking agents) can be contacted in the presence of water to form the reaction product. The components of the reaction mixture can be contacted (e.g., the reactants of the reaction mixture crosslink) at a temperature in a range of from about 10° C. to about 100° C., alternatively from about 20° C. to about 100° C., alternatively from about 20° C. to about 85° C. When the one or more crosslinking agents are CA, the components of the reaction mixture can be contacted at about 60° C. to about 100° C., alternatively from about 70° C. to about 90° C., alternatively from about 75° C. to about 85° C. When the one or more crosslinking agents are DVS, the components of the reaction mixture can be contacted at about 10° C. to about 40° C., alternatively from about 20° C. to about 30° C.

The SAP material can be a solid particulate material, for example a dehydrated cross-linked polymeric material. Thus, in one or more embodiments, the reaction product of the reaction mixture is dehydrated to remove water therefrom and form the solid particulate material. The SAP material can be a solid particulate material before it is added to one or more additional components (e.g., an aqueous fluid and one or more additives) to form an SAP fluid. The methods described herein include allowing the SAP material to absorb water from any source (e.g., an aqueous fluid) in the wellbore. After absorbing water (partially or fully), the SAP material becomes a swollen SAP material, also referred to as a swollen hydrogel, or a swollen SAP hydrogel. The absorbed water can be from the SAP fluid (e.g., an aqueous fluid) and/or any water around the SAP material (e.g., ambient water present downhole such as formation water). After the SAP material absorbs water, the SAP fluid becomes a gel-like material, which is also referred to as a gel or a hydrated polymeric complex, which may serve to block fluid flow through one or more permeable zones in the subterranean formation as described herein.

The SAP fluid can further include a cementitious material. The cementitious material may increase the mechanical strength and/or viscosity of the hydrated polymeric complex after the SAP material absorbs water. The cementitious material can include calcium, aluminum, silicon, oxygen, iron, and/or sulfur. The cementitious material can include Portland cement, pozzolana cement, gypsum cement, shale cement, acid/base cement, phosphate cement, high alumina content cement, slag cement, silica cement, high alkalinity cement, magnesia cement, or combinations thereof. Portland cements that are suited for use in the disclosed SAP fluid include, but are not limited to, Class A, C, G, H, low sulfate resistant cements, medium sulfate resistant cements, high sulfate resistant cements, or combinations thereof. The class A, C, G, and H cements are classified according to API Specification 10.

The cementitious material can be present in the SAP fluid in an amount of from about 0.001 wt. % to about 75 wt. % based on the total weight of the SAP fluid, alternatively from about 0.01 wt. % to about 50 wt. %, alternatively from about 0.04 wt. % to about 25 wt. %.

The SAP fluid can further include one or more additives. The additives can be included in the SAP fluid for improving or changing the properties thereof. Examples of such additives include but are not limited to, a weight reducing additive, a heavyweight additive, a surfactant, a scale inhibitor, a clay stabilizer, a silicate-control agent, a biocide, a biostatic agent, a storage stabilizer, a filtration control additive, a dispersant, a suspending agent, a defoamer, a foaming surfactant, latex emulsions, a formation conditioning agent, hollow glass or ceramic beads, or combinations thereof. Other mechanical property modifying additives, for example, elastomers, carbon fibers, glass fibers, metal fibers, minerals fibers, and the like can be added to further modify the mechanical properties. These additives can be included singularly or in combination and in amounts effective to provide a user designated property of the SAP fluid.

The one or more additives can be present in the SAP fluid in an amount of from about 0.001 wt. % to about 5 wt. % of the total weight of the SAP fluid, alternatively from about 0.01 wt. % to about 4 wt. %, alternatively from about 0.04 wt. % to about 2 wt. %.

The SAP material can be at least partially encapsulated in a coating material for delaying absorption of water. The coating material can include a wax, a drying oil such as tung oil and linseed oil, a polyurethane, a crosslinked partially hydrolyzed polyacrylic, a water degradable compound or polymer, a fatty acid ester, polyvinylidene dichloride (PVDC), or combinations thereof. The coating material can be coated (e.g., sprayed) onto at least a portion of the surface of the SAP material (e.g., a solid particulate material) any time prior to the SAP material contacting with the aqueous fluid to form the SAP fluid. The SAP material can be an at least partially-coated solid, particulate material prior to contact with the aqueous fluid to form the SAP fluid. The at least partially-coated solid, particulate material can be a dehydrated cross-linked polymeric material.

The coating material can be present on the SAP material in an amount of from about 0.01 wt. % to about 5 wt. % of the total weight of the SAP material, alternatively from about 0.1 wt. % to about 4 wt. %, alternatively from about 0.2 wt. % to about 2 wt. %.

In the methods as disclosed herein, the SAP fluid can form a viscous gel or a viscous hydrated polymeric complex in a time of from about 30 mins to about 600 mins, alternatively from about 60 mins to about 600 mins, alternatively from about 60 mins to about 420 mins, alternatively from about 60 mins to about 300 mins, alternatively from about 60 mins to about 180 mins. The SAP fluid can be thixotropic. Being thixotropic means having a property of thixotropy, which is a time-dependent shear thinning property. When a stress is applied (being shaken, agitated, sheared or otherwise stressed) to a thixotropic fluid, the thixotropic fluid becomes thin and less viscous over time; after the stress stops, it will take a finite time for the thixotropic fluid to return to a viscous state. The SAP fluid can be effectively thixotropic to be pumped downhole, and upon cessation of the pumping exhibits increasing viscosity.

The SAP fluid can be pumped into the wellbore, wherein the SAP fluid has a viscosity in a range of from about 30 cp to about 500 cp during the pumping, which can be measured by a Rheometer (e.g., from Anton Paar GmbH). The SAP fluid can be capable of remaining in a pumpable fluid state for equal to or greater than about 4, 6, 8, 10, 12, 14, 16, 18, 20, 22, or 24 hours. Upon cessation of the pumping, the SAP fluid can become thicker or more viscous within from about 5 mins to about 30 mins from the cessation of the pumping.

The SAP fluid has a density in a range of from about 4 lb/gal to about 23 lb/gal, alternatively from about 12 lb/gal to about 17 lb/gal, alternatively from about 12 lb/gal to about 14 lb/gal, which can be determined using a mud balance.

In the methods as disclosed herein, the SAP fluid can be used in a wellbore wherein the bottomhole circulating temperature (BHCT) can be in the range of from about 50° F. to about 500° F.; alternatively from about 100° F. to about 350° F.; alternatively from about 140° F. to about 220° F.

Prior to absorbing water, the SAP material (e.g., a dry particulate material) can have a specific gravity of from about 0.5 to about 1. Prior to absorbing water, the SAP material (e.g., a dry particulate material) can have an average particle size of from about 1 micron to about 4000 microns. Prior to absorbing water, the SAP material (e.g., a dry particulate material) can have a physical shape of platelets, shavings, fibers, flakes, ribbons, rods, strips, spheroids, toroids, pellets, tablets, or any other physical shape. After absorbing water, the SAP material becomes a swollen SAP material and the particle size and/or the physical shape may change.

The SAP material can have a capacity of absorbing water or saline solution of equal to or greater than 10 times of the weight of the SAP material. The capacity of absorbing water (e.g., a maximum capacity) is considered to be reached after full absorption of water or saline solution (e.g., soaking in sufficient amount of water for 24 hours). After partially or fully absorbing water or saline solution, the SAP material becomes a swollen SAP material, or a swollen hydrogel.

Figure 7:
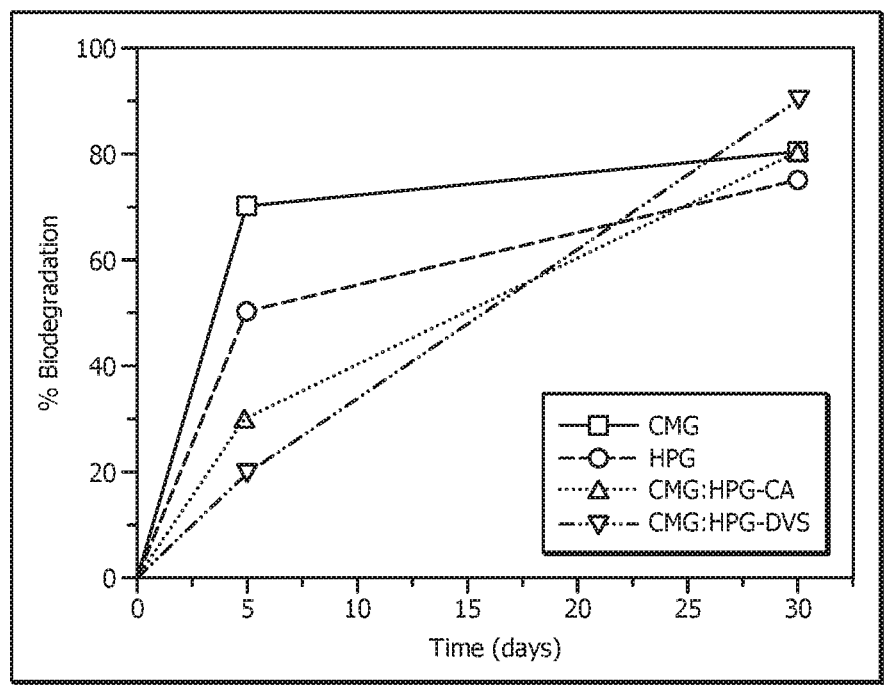
FIG. 7 shows the biodegradability of CMG, HPG, CMG: HPG-CA, and CMG:HPG-DVS at 27° C.

The SAP material can have a biodegradation rate of equal to or greater than 10% in 5 days and/or a biodegradation rate of equal to or greater than 60% in 30 days. FIG. 7 shows the biodegradability of CMG, HPG, CMG:HPG-CA, and CMG:HPG-DVS at 27° C. The biodegradation rate can be measured by a continuous Biological Oxygen Demand (BOD) test including: mixing the SAP material at 0.1 wt. % with the activated sludge water collected from a sewage treatment plant; measuring the BOD of the mixture according to method IS 3025; keeping the mixture at 27° C. for 5 days or 30 days (for the test of 5 days or 30 days, respectively) without any aeration or agitation; measuring the BOD of the mixture according to method IS 3025; and calculating the consumption of the oxygen during the test by using the two measured BODs. The measurement of BOD is a chemical procedure for determining the amount of dissolved oxygen (DO) needed by aerobic biological organisms in a body of water to break down organic material present in a given water sample at certain temperature over a specific time period. High biodegradation rate is a desirable feature of the SAP materials.

Cytotoxicity is the property of material of being toxic to cells. Cell viability is a technique of determination of living or dead cells, based on a total cell sample. Cell viability measurements may be used to evaluate the death or life of cancerous cells and the rejection of implanted organs. The cell viability of the cells incubated with an aqueous mixture of the SAP material at a concentration of 0 μg/ml to 5 μg/ml for about 2 days can be equal to or greater than 80%, measured by a test including: growing NIH3T3 (Mouse Embryonic fibroblast cell line) cells in Dulbecco's Modified Eagle's medium (DMEM, Gibco, Carlsbad, Calif., USA) supplemented with bovine calf serum to a final concentration of 10 vol. % and 100 μg/ml penicillin and/or streptomycin under 5 vol. % $CO_2$ (about 35 to 45 mmHg) atmosphere at 37° C.; seeding the cells at a density of 104 cells per well in 96 well plates and incubating for 12 to 16 hours at 37° C.; treating the cells with an aqueous mixture with increasing concentrations of the SAP material in a range of 0 μg/ml to 5 μg/ml and incubating for 48 hours; adding 3-(4,5dimethylthiazol-2-yl)-2,5-diphenyltetrazolium bromide (MIT) solution to a final concentration of 0.05 mg/ml to each well and incubating in dark at 37° C. for 4 hours; dissolving formazan crystals in the cells by adding 100 μl dimethyl sulfoxide (DMSO) to each well; and measuring optical absorbance at 540 nm on a plate reader, considering the measurement of the cells with 0 μg/ml aqueous solution of the SAP material to be 100% viable.

A method of making an SAP fluid includes: placing a mixture including an SAP material and water into a container; and blending the mixture until the mixture becomes a pumpable fluid. The container can be any container that is compatible with the mixture and has sufficient space for the mixture. A blender can be used for blending. The SAP fluid can be prepared at the wellsite. For example the solid components (e.g., the SAP material, the cementitious material) of the SAP fluid can be transported to the wellsite and combined (e.g., mixed/blended) with water located proximate the wellsite to form the SAP fluid. The solid composition of the SAP fluid can be prepared at a location remote from the wellsite and transported to the wellsite, and, if necessary, stored at the on-site location. When it is desirable to prepare the SAP fluid on the wellsite, the solid composition of the SAP fluid along with additional water and optional other additives can be added into a container (e.g. a blender tub, for example mounted on a trailer), and the mixture is then blended until the mixture becomes a pumpable fluid. Additives can be added to the SAP fluid during preparation thereof (e.g., during blending) and/or on-the-fly by addition to (e.g., injection into) the SAP fluid when being pumped into the wellbore.

As noted previously, the SAP material includes a reaction product (e.g., a product of a cross-linking reaction) of a reaction mixture including one or more viscosifying polymeric materials (e.g., CMG and/or HPC), one or more crosslinking agents (CA or DVS), and water. The one or more viscosifying polymeric materials crosslink with each other by the one or more crosslinking agents. The one or more viscosifying polymeric materials can be originally water-soluble polymers, and are made insoluble by the formation of a three-dimensional network structure using the one or more crosslinking agents with di- or tri-functionality. The presence of HPG may promote intermolecular crosslinking rather than intramolecular crosslinking, which results in stable gel formation and increasing viscosity.

The SAP material can include a reaction product of CMG, CA, and water, which can be further dehydrated to yield a solid particulate material (e.g., a dehydrated crystalline form). The SAP material can include a reaction product of HPG, CA, and water, which can be further dehydrated to yield a solid particulate material (e.g., a dehydrated crystalline form). The SAP material can include a reaction product of CMG, DVS, and water, which can be further dehydrated to yield a solid particulate material (e.g., a dehydrated crystalline form). The SAP material can include a reaction product of HPG, DVS, and water, which can be further dehydrated to yield a solid particulate material (e.g., a dehydrated crystalline form). The SAP material, referred to herein as a blend of CMG and HPG crosslinked with CA (CMG:HPG-CA), can include a reaction product of CMG, HPG, CA, and water, which can be further dehydrated to yield a solid particulate material (e.g., a dehydrated crystalline form). The SAP material, referred to herein as a blend of CMP and HPG crosslinked with DVS (CMG:HPG-DVS), can include a reaction product of CMG, HPG, DVS, and water, which can be further dehydrated to yield a solid particulate material (e.g., a dehydrated crystalline form).

Figure 2:
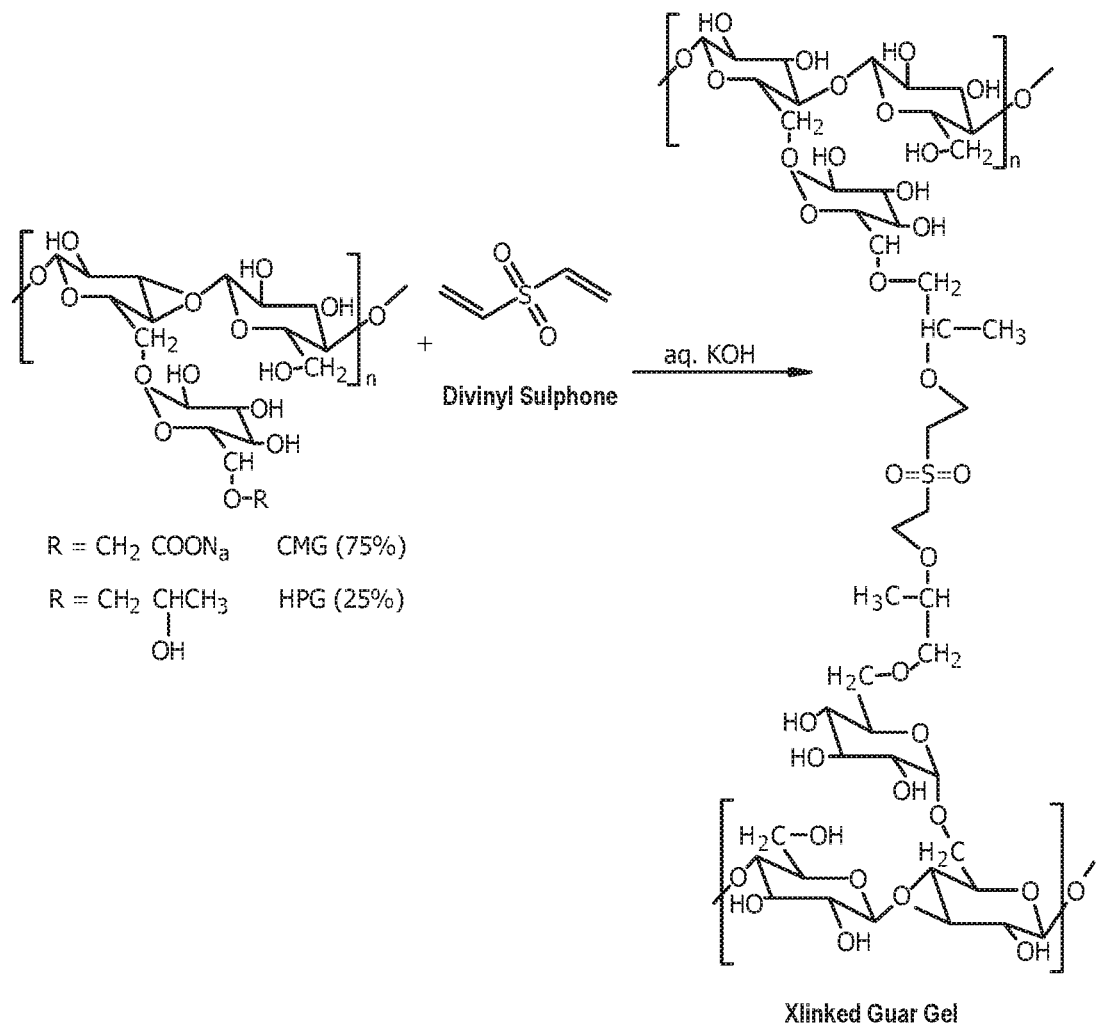
FIG. 2 shows the mechanisms of crosslinking of CMG: HPG blends with divinyl sulphone (DVS).

Examples of mechanisms of crosslinking of CMG:HPG blends with CA and DVS are shown in FIGS. 1 and 2, respectively. In the examples, the ratio of CMG to HPG on weight basis is 3:1. As in FIG. 1, in the example of crosslinking of CMG:HPG with CA, CA undergoes dehydration to yield cyclic anhydride which reacts with the —OH of HPG:CMG. Subsequently, another cyclic anhydride can be achieved into the CA structure through the other two unreacted carboxylic groups allowing the reaction with other —OH group of HPG:CMG effecting the crosslinking reactions. Therefore, an esterification mechanism can explain the crosslinking reaction in CMG:HPG blends.

In the example of crosslinking of CMG:HPG with DVS, the crosslinking reaction occurs via the hydroxyl groups of polysaccharide forming an ether bond as shown in FIG. 2. In the combination of CMG with HPG, the CMG being a polyelectrolyte is hydrophilic in nature and majority of the —OH groups at the C6 position are substituted by carboxymethyl groups. Therefore, for the crosslinking reaction only a few —OH groups at C6 position along with most of the other less reactive —OH groups at C2 and C3 positions are available. This could be one of the reasons for relatively poor crosslinking efficiency of CMG when used alone (e.g., in the absence of HPG). Further, the presence of charges on CMG induces electrostatic repulsion which can impede the intermolecular contacts leading to poor crosslinking. HPG, on the other hand is non-ionic and the —OH groups are more reactive because of less steric hindrance which promote the formation of intermolecular chemical bridges, thus allowing the macromolecules to stabilize into a 3-D polymer network. The final crosslinked polymers CMG:HPG-CA and CMG:HPG-DVS with different degrees of crosslinking were obtained by precipitation in acetone and vacuum drying.

Disclosed herein is a method of preparing an SAP material, including: placing a reaction mixture including one or more viscosifying polymeric materials (e.g., CMG and/or HPG) and water into a container; blending the reaction mixture for about 5-6 hours or until the one or more viscosifying polymeric materials are dissolved; keeping the reaction mixture at from about 0° C. to about 4° C. for about 8 to 12 hours; taking the reaction mixture back to about room temperature; adding one or more crosslinking agents (e.g., CA or DVS) into the reaction mixture; blending the reaction mixture for about 0.5 to 2 hours or until the reaction mixture becomes a homogeneous fluid; keeping the reaction mixture at a crosslinking temperature for about 24 hours to form a crosslinked gel; taking the crosslinked gel back to about room temperature; washing the crosslinked gel with water; and drying the crosslinked gel to form the SAP material. In embodiments, the SAP material is a solid, particulate material. In embodiments, the solid, particulate material is a dehydrated cross-linked polymeric material. In some embodiments, the crosslinking temperature is from about 10° C. to about 100° C., alternatively from about 20° C. to about 100° C., alternatively from about 20° C. to about 85° C. In some embodiments, keeping the reaction mixture at a crosslinking temperature is under vacuum. In some embodiments, the drying includes filtration, heating, acetone precipitation, vacuum, lyophilization, or combinations thereof. In some embodiments, the method as disclosed herein further includes spraying a coating material onto at least a portion of the surface of the SAP material. In some embodiments, the coating material includes a wax, a drying oil such as tung oil and linseed oil, a polyurethane, a crosslinked partially hydrolyzed polyacrylic, a water degradable compound or polymer, a fatty acid ester, polyvinylidene dichloride (PVDC), or combinations thereof.

Where the one or more crosslinking agents include CA, the crosslinking temperature can be from about 60° C. to about 100° C. Keeping the mixture at a crosslinking temperature can occur under vacuum.

Where the one or more crosslinking agents include DVS, the reaction mixture can have a pH of equal to or greater than 7, for example by inclusion of an effective amount of one or more pH adjusters. Where the one or more crosslinking agents include DVS, before the step of adding one or more crosslinking agents into the reaction mixture, the method can include adding a catalyst into the reaction mixture and cooling the reaction mixture to about 0° C. The catalyst can include potassium hydroxide (KOH). The catalyst can be present in an amount of from about 0.0005 wt. % to about 0.01 wt. %, based on the total weight of the reaction mixture, alternatively from about 0.001 wt. % to about 0.005 wt. %. Where the one or more crosslinking agents include DVS, the crosslinking temperature can be from about 10° C. to about 40° C.

Disclosed herein is a method of treating a subterranean formation penetrated by a wellbore, wherein the subterranean formation includes one or more permeable zones, including: introducing an SAP fluid into the wellbore, wherein the SAP fluid includes an aqueous fluid and an SAP material including a reaction product of a reaction mixture including one or more viscosifying polymeric materials, one or more crosslinking agents, and water; allowing the SAP fluid to flow into at least a portion of the one or more permeable zones in the subterranean formation; and allowing the SAP material to absorb water and form a swollen SAP material, wherein the swollen SAP material impedes fluid flow through at least a portion of the one or more permeable zones. The SAP material can include CMG:HPG-CA, CMG:HPG-DVS, or both.

The one or more permeable zones can be present in an uncased portion of the wellbore. When a permeable zone in a wellbore is uncased, the inside of the wellbore is exposed to the subterranean formation without being protected by casing, thus it is easier to have fluid communication between the wellbore and the subterranean formation around the wellbore in the permeable zone. Alternatively, the one or more permeable zones can be present in a cased portion of the wellbore. Casing is placed into a wellbore after the drilling operation. Casing of different sizes can be connected and used in the same wellbore. Through the life of the wellbore, there can be holes in the casing wall in various scenarios (e.g., casing can be structurally damaged at certain places where unexpected stress applies or where a corrosive fluid contacts the casing for a certain time), causing undesired leaks or fluid communications across the casing wall. The leaks may cause loss of product, and/or undesired fluids in the product. Without treatment, the loss of integrity of the casing can become worse. Therefore, treating of the zones around the casing with integrity issue is needed. For the reasons above, when a permeable zone in a wellbore is cased, there could still be fluid communication between the wellbore and the subterranean formation around the wellbore.

The one or more permeable zones can include a water and/or gas influx zone, and water and/or gas can undesirably flow from the surrounding formation into the wellbore via the influx zone. For example, during drilling, when a water/gas influx zone is encountered (for example a high pressure water producing zone, a high pressure gas producing zone, or both), water, gas, or both can flow, via one or more flow paths present in the subterranean formation, from the formation through the wellbore wall into the wellbore. This will dilute the drilling fluid inside the wellbore and thus make the drilling fluid less effective, and this also causes other issues that may hamper or restrict continued drilling operations and the ability to extend casing strings to desired depths. It is desirable to treat the water/gas influx zones to restrict this flow of water, gas, or both. Alternatively, one or more flow paths providing for an undesired water/gas influx can be formed as a result of loss of structural integrity of the casing (e.g., casing corrosion). The swollen SAP material impedes fluid flow through at least a portion of the flow paths of water/gas influx.

The one or more permeable zones can include a lost circulation zone, and a wellbore servicing fluid (e.g., a drilling fluid) can undesirably flow from the wellbore into the surrounding formation via the lost circulation zone. Fluids used in servicing a wellbore can be lost to the subterranean formation while circulating the fluids in the wellbore. In particular, the fluids may enter the subterranean formation via lost circulation zones, for example, depleted zones, zones of relatively low pressure, zones having naturally occurring fractures, weak zones having fracture gradients exceeded by the hydrostatic pressure of the drilling fluid, and so forth. As a result, the service provided by such fluid is more difficult to achieve. For example, a drilling fluid may be lost to the formation, resulting in the circulation of the fluid in the wellbore being too low to allow for further drilling of the wellbore. Also, a secondary cement/sealant composition may be lost to the formation as it is being placed in the wellbore, thereby rendering the secondary operation ineffective in maintaining isolation of the formation. In embodiments, the swollen SAP material impedes fluid flow through at least a portion of the lost circulation zone.

The one or more permeable zones can include a plurality of perforations in a cased portion of the wellbore formed by a perforating operation. A perforation refers to a hole punched in the casing or a wellbore wall to connect the wellbore to the oil/gas reservoir present in the surrounding formation. Over the life of wells, one or more of the multiple perforated zones may develop an undesired influx of water, gas, or both. The wellbore can be lined with casing and one or more flow paths present in the permeable zones can provide for fluid from an interior of the casing to an exterior of the casing (e.g., an adjacent subterranean formation) or vice-versa. In embodiments, the swollen SAP material impedes fluid flow through at least a portion of the plurality of perforations.

The method as disclosed herein can be used any time in the life of a well (e.g., in drilling, open hole sections, completion, and/or workover operations).

Disclosed herein is a method of treating a subterranean formation penetrated by a wellbore, including: drilling the wellbore with a drill bit connected to drill pipe; determining a location of an influx flow path from the subterranean formation into an uncased portion of the wellbore providing for an undesirable influx of water, gas, or both from the subterranean formation into the uncased portion of the wellbore; upon discontinuing drilling, introducing, via the drill pipe, an SAP fluid into at least a portion of the influx flow path from the subterranean formation into the uncased portion of the wellbore, wherein the SAP fluid includes an SAP material and an aqueous fluid; allowing the SAP material to absorb water and form a swollen SAP material wherein the swollen SAP material blocks at least a portion of the influx flow path of water, gas, or both into the wellbore from the subterranean formation; and resuming drilling of the wellbore. The SAP material can include CMG:HPG-CA, CMG:HPG-DVS, or both. The water absorbed by the SAP material can be provided by the aqueous fluid, the formation, or both. The SAP material can be at least partially encapsulated in a coating material, wherein the coating material dissolves gradually in the surrounding fluid and thus delays the SAP material from being exposed to water and absorbing an undesirable amount of water prior to being placed in the influx flow path.

Disclosed herein is a method of treating a subterranean formation penetrated by a wellbore, including: drilling the wellbore with a drill bit connected to drill pipe; determining a location of a lost circulation zone in an uncased portion of the wellbore; discontinuing drilling; introducing, via the drill pipe, an SAP fluid at the location of the lost circulation zone, wherein the SAP fluid includes an SAP material and an aqueous fluid; allowing the SAP fluid to flow into at least a portion of the lost circulation zone; allowing the SAP material to absorb water and form a swollen SAP material wherein the swollen SAP material blocks at least a portion of the lost circulation zone; and resuming drilling of the wellbore. The SAP material can include CMG:HPG-CA, CMG:HPG-DVS, or both. The water absorbed by the SAP material can be provided by the aqueous fluid, the formation, or both. The SAP material can be at least partially encapsulated in a coating material, wherein the coating material dissolves gradually in the surrounding fluid and thus delays the SAP material from being exposed to water and absorbing an undesirable amount of water prior to being placed in the influx flow path.

The method as disclosed herein has various advantages to many operations. Superabsorbent polymers (SAPs) have been extensively used in various applications such as baby diapers, sanitary napkins, and controlled release systems and as industrial thickeners. However, commercially available SAPs are mostly partially crosslinked acrylates and have no or little biodegradability. Thus the extensive usage of the commercially available SAPs may result in undesirable lack of biodegradability. The SAP material disclosed herein has high biodegradability rate and high cell viability, which are desirable features. Another advantage is that the SAP material has high absorbing capacity, which can reduce the quantity of the SAP fluid to pump into the wellbore, thus reduce the material and operation cost. The high absorbing capacity also makes it possible to control loses of fluid in a lost circulation zone without necessarily adding solids. Another advantage is that the SAP material has high mechanical strength, which makes the SAP fluid form an effective physical barrier downhole. Pumping of the SAP fluid is also easy because the SAP fluid is less viscous during pumping due to its delayed gelation behavior, while existing fluid loss control pills that are highly crosslinked present a challenge when pumping them downhole. Another advantage is the SAP material promotes intermolecular crosslinking rather than intramolecular crosslinking, which results in stable gel formation; whereas the use of CMG alone for the reaction gives rise to a poor intermolecular crosslinking leading to the formation of a water-soluble polymer. The SAP fluid is also very flexible in use, and the methods disclosed herein can be used any time in the life of a well (e.g., in drilling, open hole sections, completion, and/or workover operations).

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

The characterization of the SAPs in terms of swelling capacity was performed by swelling ratio and Dynamic Mechanical Analysis (DMA). An aqueous solution including 2 wt. % CMG:HPG (3:1) and samples with 1 wt. % of the crosslinker agents (CA or DVS) were used here. A commercial synthetic crosslinked polymer, which is a water swellable (but not water soluble) dehydrated crystallized form of crosslinked polyacrylamide and is commercially available from Halliburton Energy Services, is present in the aqueous solution in 2 wt. % for comparison. The results are in Table 1.

TABLE 1

Swelling for a commercial synthetic crosslinked polymer in comparison to CMG/HPG crosslinked with DVS and CA, respectively

| Cross-linked polymer | $Q_{H2O}$ g/g | $Q_{0.9\ wt\ \%\ NaCl}$ g/g | $Q_{3.5\ wt\ \%\ NaCl}$ g/g |
|---|---|---|---|
| Commercial synthetic crosslinked polymer | 212 | 32 | 19.4 |
| Cross-linked CMG/HPG-DVS | 1038 | 339 | 300 |
| Cross-linked CMG/HPG-CA | 1049 | 350 | 290 |

Example 2

Figure 3A:
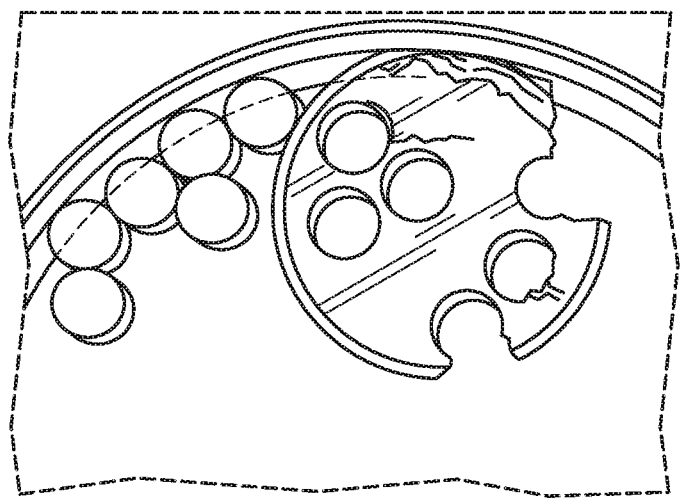
FIG. 3A shows the swollen hydrogels sample punched from discs.
Figure 3B:
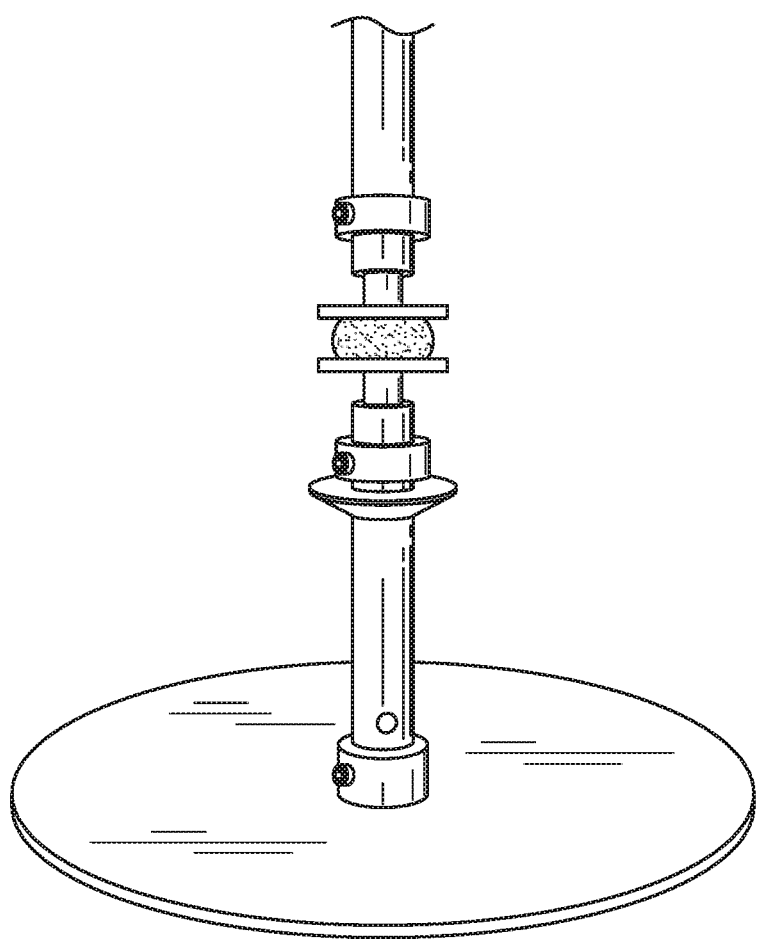
FIG. 3B shows the punched disc mounted between two parallel plates of Dynamic Mechanical Analyzer (DMA).

The mechanical strength of a swollen hydrogel can be studied by modulus measurements. Particularly, the uniaxial compression tests were performed and gave reproducible results. The mechanical strength of the swollen hydrogels made from a reaction mixture with 2 wt. % CMG:HPG crosslinked with 8.0 wt. % CA or DVS, respectively, where the weight ratio of CMG to HPG is 3:1, were determined by uniaxial compression of swollen hydrogels (of dimensions 15.0 mm diameter and 10.8 mm height) between two parallel plates of RSA-III (TA instruments, USA) using Dynamic Mechanical Analyzer at 25° C. The crosshead speed was maintained at 1 mm/min. The appearance of the swollen hydrogels and mounting of a sample in DMA are shown in FIGS. 3A and 3B.

Figure 4:
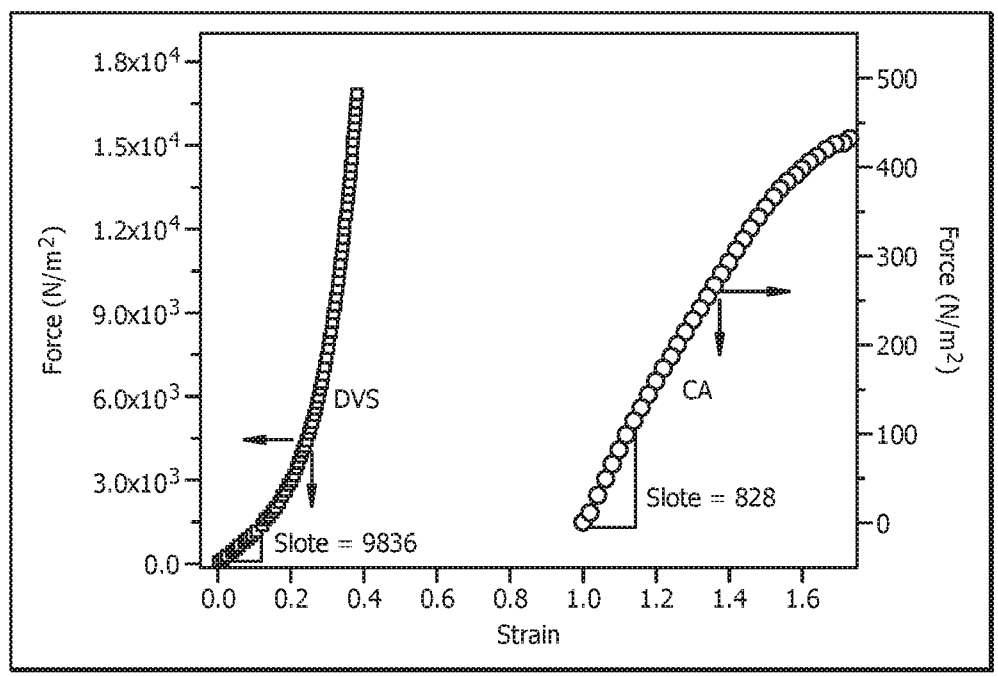
FIG. 4 is the plots of force versus strain for the swollen hydrogels of CMG:HPG-CA and CMG:HPG-DVS with 8.0 wt. % crosslinking agent.

The modulus for equilibrium swollen CMG:HPG-CA and CMG:HPG-DVS hydrogels made from the same reaction mixture as above were also compared. As shown in FIG. 4, the DVS crosslinked swollen hydrogels show higher modulus compared to the CA crosslinked swollen hydrogels. Further, the DVS crosslinked swollen hydrogels exhibit strain hardening behavior with exponential increase in force at low strains whereas, CA crosslinked swollen hydrogels show more elastic behavior with soft nature. From these results, it can be concluded that DVS crosslinked swollen hydrogels are more homogenous in nature with well crosslinked structure.

Example 3

Figure 5A:
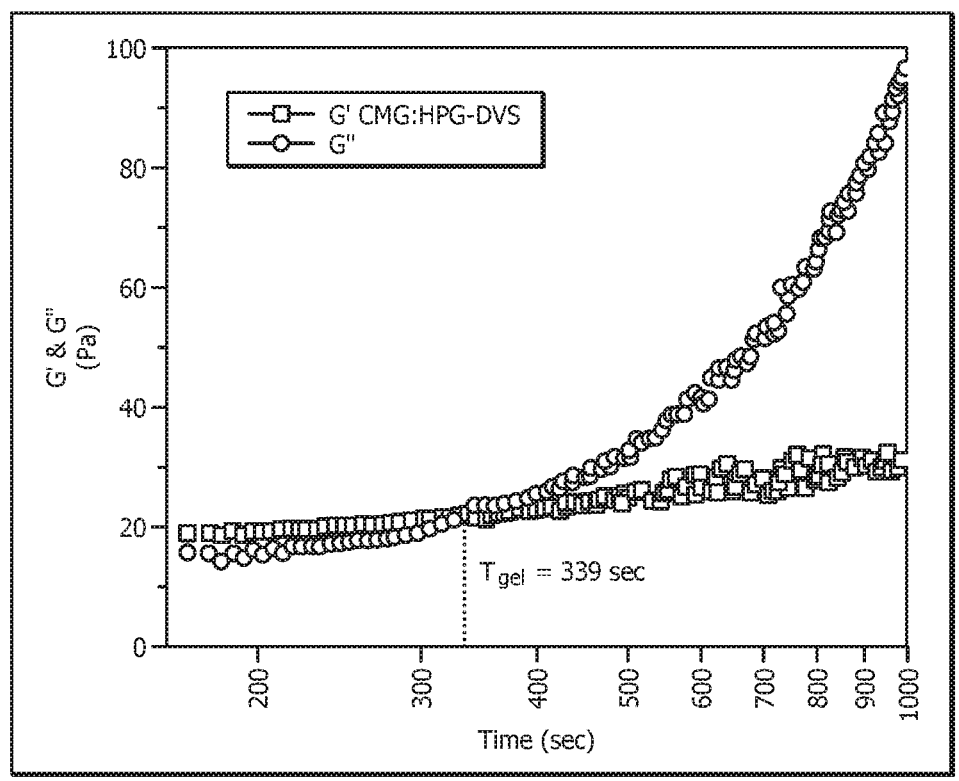
FIGS. 5A and 5B show the influence of temperature on the time of gelation for CMG:HPG-DVS samples with 4.0 wt. % DVS crosslinking agent by oscillatory measurements at 25° C. and 35° C., respectively.
Figure 5B:
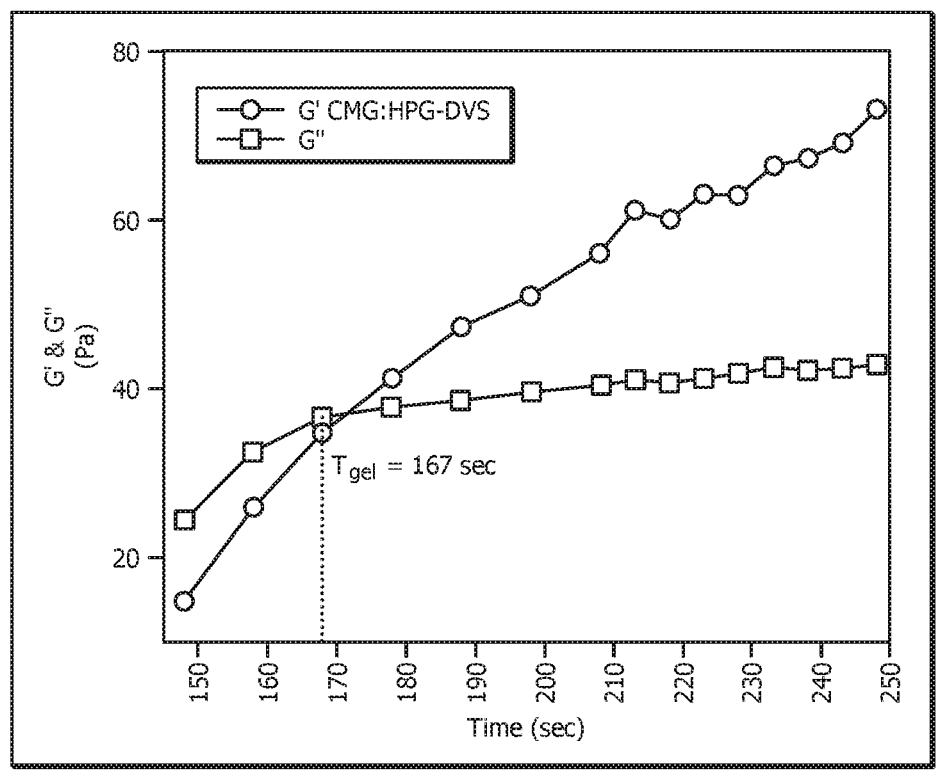

FIGS. 5A and 5B are the plots of storage modulus G' and loss modulus G" of CMG:HPG and DVS solution mixture with 4.0 wt. % DVS content with respect to time at 25° C. and 35° C., respectively. The total concentration of CMG and HPG is 4.0 wt. % and the weight ratio of CMG and HPG is 3:1. A cone-and-plate geometry with 50 mm diameter, 1° angle, 1% strain, and 0.1 Hz frequency were used. In the initial period, when the reaction mixture is still in the liquid state, G">G', indicating the dominance of viscous behavior. However, with increase in time, G'>G" and the solution transforms into a gel due to the crosslinking reaction between CMG:HPG and DVS. In the first approximation, the time corresponding to the crossover of G' and G" (G'=G") can be considered as an indication for the incipient gelation. From FIGS. 5A and 5B, it can be seen that for the crosslinking reaction with 4.0 wt. % DVS, the crossover occurs at about 340 seconds and about 170 seconds respectively, for the reactions at 25° C. and 35° C. It can be seen that by increasing the reaction temperature by 10° C., the solution-gel transition time reduces by 50%. It can also be seen from FIGS. 5A and 5B that, the values of G' increase sharply after the incipient gelation and probably reach a plateau value after the complete gelation exhibiting high value of the storage modulus (G').

Figure 6:
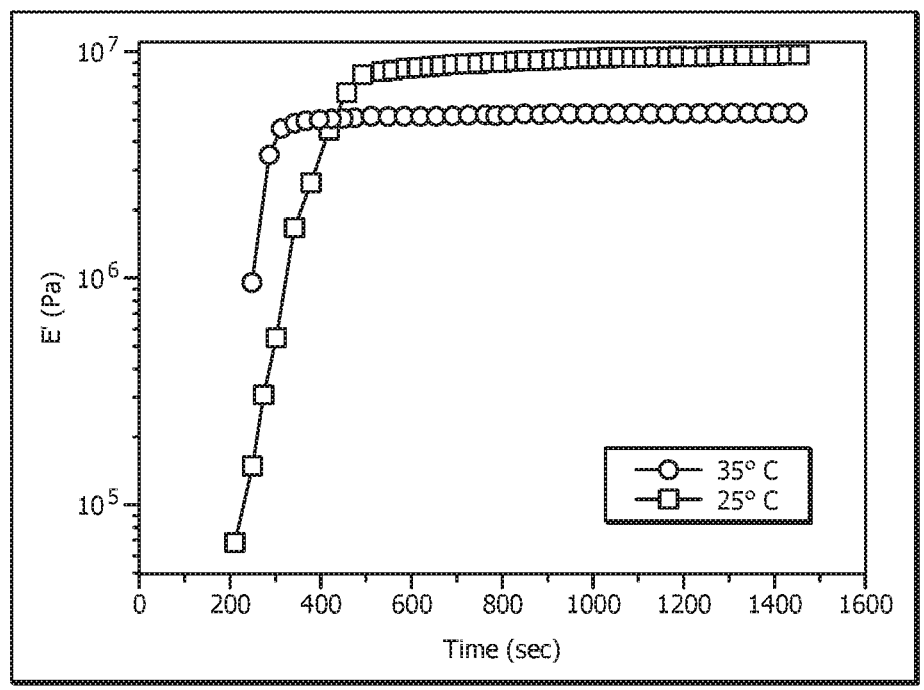
FIG. 6 shows the influence of temperature on the time of complete gelation for CMG:HPG with 4 wt. % DVS crosslinking agent by dynamic mechanical analysis test at 25° C. and 35° C.

In order to examine the complete gelation process, the gelation experiments were performed in a Dynamic Mechanical Analyser (DMA) using RSA-III DMA Spectrometer. The viscoelastic tensile modulus (E') was monitored as a function of time for the reaction between CMG:HPG and DVS (4.0 wt. %) at temperatures 25° C. and 35° C. The total concentration of CMG and HPG is 4.0 wt. % and the ratio of CMG and HPG is 3:1. FIG. 6 shows the plots of E' versus time for CMG:HPG and DVS (4.0 wt. %) at 25° C. and 35° C. It is observed that E' increases with time sharply and attains a plateau value after complete gelation. The obtained gels after complete gelation were found to have very high modulus with good mechanical strength. A cup of 25 mm diameter and 10 mm height, 1% strain, 0.1 Hz frequency, and 0.05 N pre-tension were used in the measurement.

Example 4

FIG. 7 shows the biodegradation of CMG, HPG, and CMG:HPG-CA and CMG:HPG-DVS measured by the continuous Biological Oxygen Demand (BOD) test by titration method IS 3025 monitored on the $5^{th}$ and $30^{th}$ day from the beginning of the test. The biodegradation of unmodified CMG and HPG was fast and the degradation was 50-70% in the first 5 days and reached almost 80% in 30 days. Whereas, the SAP materials showed slower degradation initially (up to 20% to 30%) in 5 days but exhibited nearly 80% to 90% degradation in 30 days. These studies clearly confirmed the biodegradable nature of the SAP materials. This is a desirable feature of the SAP materials.

The procedures of the BOD test are as follows: mixing the SAP material at 0.1 wt. % with the activated sludge water collected from a sewage treatment plant; measuring the BOD of the mixture according to method IS 3025; keeping the mixture at 27° C. for 5 days or 30 days (for the test of 5 days or 30 days, respectively) without any aeration or agitation; measuring the BOD of the mixture according to method IS 3025; and calculating the consumption of the oxygen during the test by using the two measured BODs.

Example 5

Figure 8:
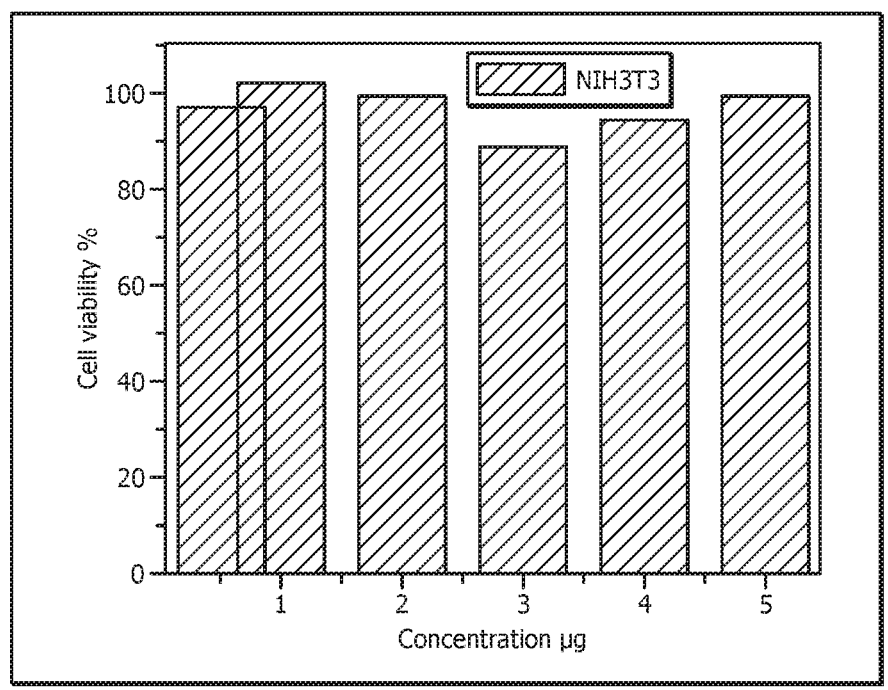
FIG. 8 shows the cell viability for CMG:HPG-DVS.

FIG. 8 shows cell viability versus different concentrations of the SAP materials. The results show a very high survival rate of cells treated by CMG:HPG-DVS, measured nearly 90%. These studies indicate that the CMG:HPG-DVS SAP material does not show any cytotoxicity even at higher concentrations and exhibit very good biocompatibility. Further study concerning the biocompatibility of the CMG:HPG-DVS SAP material with respect to fibroblast cell line was performed with the aim of acquiring more information concerning its biocompatibility. 3T3 fibroblasts were used to perform biocompatibility studies in terms of cell viability and proliferation after contact with media conditioned by the SAP material.

The procedures of the cell viability test are as follows: growing NIH3T3 (Mouse Embryonic fibroblast cell line) cells in Dulbecco's Modified Eagle's medium (DMEM, Gibco, Carlsbad, Calif., USA) supplemented with bovine calf serum to a final concentration of 10 vol. % and 100 µg/ml penicillin and/or streptomycin under 5 vol. % $CO_2$ (about 35 to 45 mmHg) atmosphere at 37° C.; seeding the cells at a density of 104 cells per well in 96 well plates and incubating for 12 to 16 hours at 37° C.; treating the cells with an aqueous mixture with increasing concentrations of the SAP material in a range of 0 µg/ml to 5 µg/ml and incubating for 48 hours; adding 3-(4,5dimethylthiazol-2-yl)-2,5-diphenyltetrazolium bromide (MIT) solution to a final concentration of 0.05 mg/ml to each well and incubating in dark at 37° C. for 4 hours; dissolving formazan crystals in the cells by adding 100 µl dimethyl sulfoxide (DMSO) to each well; and measuring optical absorbance at 540 nm on a plate reader, considering the measurement of the cells with 0 µg/ml aqueous solution of the SAP material to be 100% viable.

ADDITIONAL DISCLOSURE

The following are non-limiting, specific embodiments in accordance with the present disclosure:

A first embodiment, which is a method of treating a subterranean formation penetrated by a wellbore, wherein the subterranean formation includes one or more permeable zones, including: introducing an SAP fluid into the wellbore, wherein the SAP fluid includes an aqueous fluid and an SAP material including a reaction product of a reaction mixture including one or more viscosifying polymeric materials, one or more crosslinking agents, and water, allowing the SAP fluid to flow into at least a portion of the one or more permeable zones in the subterranean formation, and allowing the SAP material to absorb water and form a swollen SAP material, wherein the swollen SAP material impedes fluid flow through at least a portion of the one or more permeable zones.

A second embodiment, which is the method of the first embodiment, wherein the one or more viscosifying polymeric materials include one or more polysaccharides.

A third embodiment, which is the method of the second embodiment, wherein the one or more polysaccharides include carboxymethyl guar (CMG), hydroxypropyl guar (HPG), hydroxyethyl cellulose, hydroxyl propyl cellulose, carboxymethyl cellulose, carboxymethyl hydroxyl propyl cellulose, carboxymethyl starch and derivatives thereof, hydroxyethyl guar, hydroxyl propyl guar, carboxymethyl hydroxyl propyl guar, hydroxyethyl tamarind, hydroxyl propyl tamarind, carboxymethyl tamarind, carboxymethyl hydroxyl propyl tamarind, carrageenan and derivatives thereof, sodium alginate and derivatives thereof, chitin and derivatives thereof, or combinations thereof.

A fourth embodiment, which is the method of the first embodiment, wherein the one or more viscosifying polymeric materials include polyvinyl alcohol and derivatives thereof, polyaspartic acid and derivatives thereof, polyacrylic acid and derivatives thereof, or combinations thereof.

A fifth embodiment, which is the method of the first embodiment, wherein the one or more viscosifying polymeric materials include one or more compounds selected from the group consisting of locust bean gum, Karaya gum, gum tragacanth, hydrophobically modified guars, high-molecular weight polysaccharides composed of mannose and galactose sugars, heteropolysaccharides obtained by the fermentation of starch-derived sugars, xanthan, pectins, diutan, welan, gellan, scleroglucan, chitosan, dextran, substituted or unsubstituted galactomannans, starch, cellulose, cellulose ethers, carboxycelluloses, hydroxypropyl cellulose, carboxyalkylhydroxyethyl celluloses, carboxymethyl hydroxyethyl cellulose, methyl cellulose, sodium polyacrylate, polyacrylamide, partially hydrolyzed polyacrylamide, polymethacrylamide, poly(acrylamido-2-methyl-propane sulfonate), poly(sodium-2-acrylamide-3-propylsulfonate), copolymers of acrylamide and acrylamido-2-methyl-propane sulfonate, terpolymers of acrylamido-2-methyl-propane sulfonate, acrylamide and vinylpyrrolidone or itaconic acid, and combinations thereof.

A sixth embodiment, which is the method of the second embodiment, wherein the one or more polysaccharides include carboxymethyl guar (CMG), hydroxypropyl guar (HPG), or a combination thereof.

A seventh embodiment, which is the method of the sixth embodiment, wherein the one or more polysaccharides include CMG and HPG and the ratio of CMG to HPG in the reaction mixture is from about 1:1 to about 4:1 on weight basis, alternatively from about 2:1 to about 4:1, alternatively from about 2.8:1 to about 3.2:1, alternatively about 3:1 on weight basis.

An eighth embodiment, which is the method of any of the first through the seventh embodiments, wherein the one or more viscosifying polymeric materials have a molecular weight in a range of equal to or greater than 1.2 MM Da to equal to or less than 5 MM Da, alternatively in a range of equal to or greater than 1.5 MM Da to equal to or less than 5 MM Da, alternatively in a range of equal to or greater than 1.7 MM Da to equal to or less than 5 MM Da.

A ninth embodiment, which is the method of any of the first through the eighth embodiments, wherein the one or more viscosifying polymeric materials are present in the reaction mixture in an amount of from about 1 wt. % to about 5 wt. %, based on the total weight of the reaction mixture, alternatively from about 1.5 wt. % to about 4 wt. %, alternatively from about 2 wt. % to about 3 wt. %.

A tenth embodiment, which is the method of any of the first through the ninth embodiments, wherein the one or more crosslinking agents include citric acid (CA), divinyl sulphone (DVS), carbodiimide, glutraldehyde, epichlorohydrin, succinic acid, succinic anhydrides, or combinations thereof.

An eleventh embodiment, which is the method of any of the first through the tenth embodiments, wherein the one or more crosslinking agents include one or more compounds that can be described by this formula:

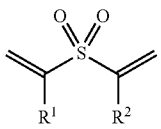

wherein $R^1$ includes a hydrogen or a hydrocarbon group having from about 1 to about 30 carbon atoms, $R^2$ includes a hydrogen or a hydrocarbon group having from about 1 to about 30 carbon atoms, and $R^1$ and $R^2$ do not include a hydroxyl group.

A twelfth embodiment, which is the method of any of the first through the eleventh embodiments, wherein the one or more crosslinking agents include citric acid (CA), divinyl sulphone (DVS), or a combination thereof.

A thirteenth embodiment, which is the method of any of the first through the twelfth embodiments, wherein the one or more crosslinking agents are present in the reaction mixture in an amount of from about 0.001 wt. % to about 10 wt. %, based on the total weight of the reaction mixture, alternatively from about 2 wt. % to about 8 wt. %, alternatively from about 4 wt. % to about 6 wt. %.

A fourteenth embodiment, which is the method of any of the first through the thirteenth embodiments, wherein the ratio of the one or more crosslinking agents to the one or more viscosifying polymeric materials in the reaction mixture is from about 0.5:1 to about 5:1 on weight basis, alternatively from about 0.7:1 to about 4.5:1, alternatively from about 1:1 to about 4:1.

A fifteenth embodiment, which is the method of any of the first through the fourteenth embodiments, wherein the aqueous fluid in the SAP fluid and the water in the reaction mixture include water selected from the group consisting of freshwater, saltwater, brine, seawater, and combinations thereof.

A sixteenth embodiment, which is the method of any of the first through the fourteenth embodiments, wherein the aqueous fluid in the SAP fluid is salt water including the chloride, bromide, acetate, and formate salts of potassium, sodium, calcium, magnesium, and zinc, or combinations thereof.

A seventeenth embodiment, which is the method of the sixteenth embodiment, wherein the salt is present in the salt water in an amount of from about 0.5 wt. % to about 30 wt. % based on the total weight of the salt water, alternatively from about 5 wt. % to about 25 wt. %, alternatively from about 10 wt. % to about 20 wt. %.

An eighteenth embodiment, which is the method of any of the first through the seventeenth embodiments, wherein the aqueous fluid is present in the SAP fluid in an amount of from about 10 wt. % to about 50 wt. % based on the total weight of the SAP fluid, alternatively from about 10 wt. % to about 40 wt. %, alternatively from about 10 wt. % to about 30 wt. %.

A nineteenth embodiment, which is the method of any of the first through the eighteenth embodiments, wherein the water is present in the reaction mixture in an amount of from about 70 wt. % to about 99 wt. % based on the total weight of the reaction mixture, alternatively from about 75 wt. % to about 95 wt. %, alternatively from about 80 wt. % to about 90 wt. %.

A twentieth embodiment, which is the method of any of the first through the nineteenth embodiments, wherein the SAP material includes CMG:HPG-CA, CMG:HPG-DVS, or both.

A twenty-first embodiment, which is the method of any of the first through the twentieth embodiments, wherein the SAP fluid further includes a cementitious material.

A twenty-second embodiment, which is the method of the twenty-first embodiment, wherein the cementitious material includes Portland cement, pozzolana cement, gypsum cement, shale cement, acid/base cement, phosphate cement, high alumina content cement, slag cement, silica cement, high alkalinity cement, magnesia cement, or combinations thereof.

A twenty-third embodiment, which is the method of any of the twenty-first and the twenty-second embodiments, wherein the cementitious material is present in the SAP fluid in an amount of from about 0.001 wt. % to about 75 wt. % based on the total weight of the SAP fluid, alternatively from about 0.01 wt. % to about 50 wt. %, alternatively from about 0.04 wt. % to about 25 wt. %.

A twenty-fourth embodiment, which is the method of any of the first through the twenty-third embodiments, wherein the SAP fluid further includes an additive selected from the group consisting of a weight reducing additive, a heavy-weight additive, a surfactant, a scale inhibitor, a clay stabilizer, a silicate-control agent, a biocide, a biostatic agent, a storage stabilizer, a filtration control additive, a dispersant, a suspending agent, a defoamer, a foaming surfactant, latex emulsions, a formation conditioning agent, hollow glass or ceramic beads, elastomers, carbon fibers, glass fibers, metal fibers, minerals fibers, and combinations thereof.

A twenty-fifth embodiment, which is the method of the twenty-fourth embodiment, wherein the additive is present in the SAP fluid in an amount of from about 0.001 wt. % to about 5 wt. % of the total weight of the SAP fluid, alternatively from about 0.01 wt. % to about 4 wt. %, alternatively from about 0.04 wt. % to about 2 wt. %.

A twenty-sixth embodiment, which is the method of any of the first through the twenty-fifth embodiments, wherein the SAP material is at least partially encapsulated in a coating material.

A twenty-seventh embodiment, which is the method of the twenty-sixth embodiment, wherein the coating material includes a wax, a drying oil such as tung oil and linseed oil, a polyurethane, a crosslinked partially hydrolyzed polyacrylic, a water degradable compound or polymer, a fatty acid ester, polyvinylidene dichloride (PVDC), or combinations thereof.

A twenty-eighth embodiment, which is the method of any of the twenty-sixth and the twenty-seventh embodiments, wherein the coating material is present on the SAP material in an amount of from about 0.01 wt. % to about 5 wt. % of the total weight of the SAP material, alternatively from about 0.1 wt. % to about 4 wt. %, alternatively from about 0.2 wt. % to about 2 wt. %.

A twenty-ninth embodiment, which is the method of any of the twenty-sixth through the twenty-eighth embodiments, wherein the coating material is sprayed onto at least a portion of the surface of the SAP material.

A thirtieth embodiment, which is the method of any of the twenty-sixth through the twenty-ninth embodiments, wherein the SAP material is an at least partially coated particulate material prior to contacting with the aqueous fluid to form the SAP fluid.

A thirty-first embodiment, which is the method of the thirtieth embodiment, wherein the at least partially coated particulate material is a dehydrated cross-linked polymeric material.

A thirty-second embodiment, which is the method of any of the first through the thirty-first embodiments, wherein the one or more crosslinking agents include DVS, wherein the reaction mixture further includes a pH adjuster.

A thirty-third embodiment, which is the method of the thirty-second embodiment, wherein the pH adjuster includes hydroxides, phosphates, carbonates, bicarbonates, borates, derivatives thereof, or combinations thereof.

A thirty-fourth embodiment, which is the method of any of the thirty-second and the thirty-third embodiments, wherein the pH adjuster is present in the reaction mixture in an amount of from about 0.05 wt. % to about 2 wt. % based on the total weight of the reaction mixture.

A thirty-fifth embodiment, which is the method of any of the first through the thirty-fourth embodiments, wherein the one or more crosslinking agents include DVS, wherein the reaction mixture has a pH of equal to or greater than 7.

A thirty-sixth embodiment, which is the method of any of the first through the thirty-fifth embodiments, wherein the one or more crosslinking agents include DVS, wherein the reaction mixture further includes a catalyst.

A thirty-seventh embodiment, which is the method of the thirty-sixth embodiment, wherein the catalyst includes potassium hydroxide (KOH).

A thirty-eighth embodiment, which is the method of any of the thirty-sixth and the thirty-seventh embodiments, wherein the catalyst is present in the reaction mixture in an amount of from about 0.0005 wt. % to about 0.01 wt. %, based on the total weight of the reaction mixture, alternatively from about 0.001 wt. % to about 0.005 wt. %.

A thirty-ninth embodiment, which is the method of any of the first through the thirty-eighth embodiments, wherein the reaction mixture reacts at a temperature in a range of from about 10° C. to about 100° C.

A fortieth embodiment, which is the method of any of the first through the thirty-ninth embodiments, wherein the SAP fluid forms a viscous gel or a viscous hydrated polymeric complex in from about 30 mins to about 600 mins.

A forty-first embodiment, which is the method of any of the first through the fortieth embodiments wherein the SAP fluid is thixotropic.

A forty-second embodiment, which is the method of any of the first through the forty-first embodiments, wherein introducing the SAP fluid into the wellbore including pumping the SAP fluid into the wellbore and wherein the SAP fluid has a viscosity in a range of from about 30 cp to about 500 cp during the pumping.

A forty-third embodiment, which is the method of any of the first through the forty-second embodiments, wherein the SAP fluid is capable of remaining in a pumpable fluid state for at least about 4 hours.

A forty-fourth embodiment, which is the method of any of the forty-second and the forty-third embodiments, wherein upon cessation of the pumping, the SAP fluid becomes thicker or more viscous within from about 5 mins to about 30 mins from the cessation of the pumping.

A forty-fifth embodiment, which is the method of any of the first through the forty-fourth embodiments, wherein the SAP fluid has a density in a range of from about 4 lb/gal to about 23 lb/gal, alternatively from about 12 lb/gal to about 17 lb/gal, alternatively from about 12 lb/gal to about 14 lb/gal.

A forty-sixth embodiment, which is the method of any of the first through the forty-fifth embodiments, wherein the SAP material has a capacity of absorbing water or saline solution of equal to or greater than 10 times of the weight of the SAP material.

A forty-seventh embodiment, which is the method of any of the first through the forty-sixth embodiments, wherein the SAP material is a dehydrated cross-linked polymeric material prior to contact with the aqueous fluid to form the SAP fluid.

A forty-eighth embodiment, which is the method of the forty-seventh embodiment, wherein after absorbing water, the SAP material becomes a partially or fully swollen SAP material.

A forty-ninth embodiment, which is the method of any of the first through the forty-eighth embodiments, wherein the SAP material has a biodegradation rate of equal to or greater than 10% in 5 days by a test including mixing the SAP material at 0.1 wt. % with the activated sludge water collected from a sewage treatment plant, measuring the Biological oxygen Demand (BOD) of the mixture according to method IS 3025, keeping the mixture at 27° C. for 5 days without any aeration or agitation, measuring the BOD of the mixture according to method IS 3025, and calculating the consumption of the oxygen during the test by using the two measured BODs.

A fiftieth embodiment, which is the method of any of the first through the forty-ninth embodiments, wherein the SAP material has a biodegradation rate of equal to or greater than 60% in 30 days by a test including mixing the SAP material at 0.1 wt. % with the activated sludge water collected from the sewage treatment plant, measuring the BOD of the mixture according to method IS 3025, keeping the mixture at 27° C. for 30 days without any aeration or agitation, measuring the BOD of the mixture according to method IS 3025, and calculating the consumption of the oxygen during the test by using the two measured BODs.

A fifty-first embodiment, which is the method of any of the first through the fiftieth embodiments, wherein the cell viability of the cells incubated with an aqueous mixture of the SAP material at a concentration of 0 µg/ml to 5 µg/ml for about 2 days is equal to or greater than 80%, measured by a test including growing NIH3T3 (Mouse Embryonic fibroblast cell line) cells in Dulbecco's Modified Eagle's medium (DMEM, Gibco, Carlsbad, Calif., USA) supplemented with bovine calf serum to a final concentration of 10 vol. % and 100 µg/ml penicillin and/or streptomycin under 5 vol. % $CO_2$ (about 35 to 45 mmHg) atmosphere at 37° C., seeding the cells at a density of 104 cells per well in 96 well plates and incubating for 12 to 16 hours at 37° C., treating the cells with an aqueous mixture with increasing concentrations of the SAP material in a range of 0 µg/ml to 5 µg/ml and incubating for 48 hours, adding 3-(4,5dimethylthiazol-2-yl)-2,5-diphenyltetrazolium bromide (MTT) solution to a final concentration of 0.05 mg/ml to each well and incubating in dark at 37° C. for 4 hours, dissolving formazan crystals in the cells by adding 100 µl dimethyl sulfoxide (DMSO) to each well, and measuring optical absorbance at 540 nm on a plate reader, considering the measurement of the cells with 0 µg/ml aqueous solution of the SAP material to be 100% viable.

A fifty-second embodiment, which is the method of any of the first through the fifty-first embodiments, wherein the bottomhole circulating temperature (BHCT) is in the range of from about 50° F. to about 500° F.

A fifty-third embodiment, which is the method of any of the first through the fifty-second embodiments, wherein the SAP material has a specific gravity of from about 0.5 to about 1.

A fifty-fourth embodiment, which is the method of any of the first through the fifty-third embodiments, wherein the SAP material has an average particle size of from about 1 micron to about 4000 microns.

A fifty-fifth embodiment, which is the method of any of the first through the fifty-fourth embodiments, wherein the SAP material has a physical shape of platelets, shavings, fibers, flakes, ribbons, rods, strips, spheroids, toroids, pellets, tablets, or any other physical shape.

A fifty-sixth embodiment, which is a method of preparing an SAP fluid, including placing a mixture including an SAP material and water into a container, and blending the mixture until the mixture becomes a pumpable fluid.

A fifty-seventh embodiment, which is the method of any of the first through the fifty-sixth embodiments, wherein the subterranean formation including one or more permeable zones is uncased.

A fifty-eighth embodiment, which is the method of the fifty-seventh embodiment, wherein the one or more permeable zones include a lost circulation zone and wherein a drilling fluid flows from the wellbore into the surrounding formation via the lost circulation zone.

A fifty-ninth embodiment, which is the method of the fifty-seventh embodiment, wherein the one or more permeable zones include a water and/or gas influx zone and wherein water and/or gas flows from the surrounding formation into the wellbore via the influx zone.

A sixtieth embodiment, which is the method of the first embodiment, wherein the subterranean formation including one or more permeable zones is cased and includes a plurality of perforations formed by a perforating operation.

A sixty-first embodiment, which is the method of the sixtieth embodiment, wherein the swollen SAP material impedes fluid flow through at least a portion of the plurality of perforations.

A sixty-second embodiment, which is a method of treating a subterranean formation penetrated by a wellbore, including drilling the wellbore with a drill bit connected to drill pipe, determining a location of an influx flow path from the subterranean formation into an uncased portion of the wellbore providing for an undesirable influx of water, gas, or both from the subterranean formation into the uncased portion of the wellbore, upon discontinuing drilling, introducing, via the drill pipe, an SAP fluid into at least a portion of the influx flow path from the subterranean formation into the uncased portion of the wellbore, wherein the SAP fluid includes an SAP material and an aqueous fluid and wherein the SAP material includes a reaction product of a reaction mixture including one or more viscosifying polymeric materials, one or more crosslinking agents, and water, allowing the SAP material to absorb water and form a swollen SAP material, wherein the swollen SAP material blocks at least a portion of the influx flow path of water, gas, or both into the wellbore from the subterranean formation, and resuming drilling of the wellbore.

A sixty-third embodiment, which is the method of the sixty-second embodiment, wherein the SAP material includes CMG:HPG-CA, CMG:HPG-DVS, or both.

A sixty-fourth embodiment, which is the method of the sixty-second or the sixty-third embodiment, wherein the water absorbed by the SAP material is provided by the aqueous fluid, the formation, or both.

A sixty-fifth embodiment, which is a method of treating a subterranean formation penetrated by a wellbore, including drilling the wellbore with a drill bit connected to drill pipe, determining a location of a lost circulation zone in an uncased portion of the wellbore, discontinuing drilling, introducing, via the drill pipe, an SAP fluid at the location of the lost circulation zone, wherein the SAP fluid includes an SAP material and an aqueous fluid and wherein the SAP material includes a reaction product of a reaction mixture including one or more viscosifying polymeric materials, one or more crosslinking agents, and water, allowing the SAP fluid to flow into at least a portion of the lost circulation zone, allowing the SAP material to absorb water and form a swollen SAP material, wherein the swollen SAP material blocks at least a portion of the lost circulation zone, and resuming drilling of the wellbore.

A sixty-sixth embodiment, which is the method of the sixty-fifth embodiment, wherein the SAP material includes CMG:HPG-CA, CMG:HPG-DVS, or both.

A sixty-seventh embodiment, which is the method of the sixty-fifth or the sixty-sixth embodiment, wherein the water absorbed by the SAP material is provided by the aqueous fluid, the formation, or both.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. When a feature is described as "optional," both embodiments with this feature and embodiments without this feature are disclosed. Similarly, the present disclosure contemplates embodiments where this feature is required and embodiments where this feature is specifically excluded. Both alternatives are intended to be within the scope of the claim. Use of broader terms such as includes, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of treating a subterranean formation penetrated by a wellbore, comprising:
    drilling the wellbore with a drill bit connected to drill pipe;
    determining a location of an influx flow path from the subterranean formation into an uncased portion of the wellbore providing for an undesirable influx of water, gas, or both from the subterranean formation into the uncased portion of the wellbore;
    upon discontinuing drilling, introducing, via the drill pipe, an SAP fluid into at least a portion of the influx flow path from the subterranean formation into the uncased portion of the wellbore, wherein the SAP fluid comprises an SAP material and an aqueous fluid and wherein the SAP material comprises a reaction product of a reaction mixture comprising one or more viscosifying polymeric materials, one or more crosslinking agents, and water;
    allowing the SAP material to absorb water and form a swollen SAP material, wherein the swollen SAP material blocks at least a portion of the influx flow path of water, gas, or both into the wellbore from the subterranean formation; and
    resuming drilling of the wellbore.

2. The method of claim 1, wherein the viscosifying polymer materials comprise one or more polysaccharides independently selected from hydroxyethyl tamarind, hydroxyl propyl tamarind, carboxymethyl tamarind, carboxymethyl hydroxyl propyl tamarind, or combinations thereof.

3. The method of claim 1, wherein the viscosifying polymer materials comprise one or more polysaccharides independently selected from carboxymethyl guar (CMG), hydroxypropyl guar (HPG), or a combination thereof.

4. The method of claim 3, wherein the one or more polysaccharides are CMG and HPG and the ratio of CMG to HPG in the reaction mixture is from about 1:1 to about 4:1 on weight basis, alternatively from about 2:1 to about 4:1, alternatively from about 2.8:1 to about 3.2:1.

5. The method of claim 1, wherein the one or more viscosifying polymeric materials are present in the reaction mixture in an amount of from about 1 wt. % to about 5 wt. %, based on the total weight of the reaction mixture.

6. The method of claim 1, wherein the one or more crosslinking agents are independently selected from citric acid (CA), divinyl sulphone (DVS), or a combinations thereof.

7. The method of claim 1, wherein the one or more crosslinking agents are present in the reaction mixture in an amount of from about 0.001 wt. % to about 10 wt. %, based on the total weight of the reaction mixture.

8. The method of claim 1, wherein the ratio of the one or more crosslinking agents to the one or more viscosifying polymeric materials in the reaction mixture is from about 0.5:1 to about 5:1 on weight basis.

9. The method of claim 1, wherein the SAP material is CMG:HPG-CA, CMG:HPG-DVS, or both.

10. The method of claim 1, wherein the SAP material is at least partially encapsulated in a coating material.

11. The method of claim 1, wherein the one or more crosslinking agents comprise DVS, wherein the reaction mixture further comprises a pH adjuster or a catalyst.

12. A method of treating a subterranean formation penetrated by a wellbore, comprising:
    drilling the wellbore with a drill bit connected to drill pipe;
    determining a location of a lost circulation zone in an uncased portion of the wellbore;
    discontinuing drilling;
    introducing, via the drill pipe, an SAP fluid at the location of the lost circulation zone, wherein the SAP fluid comprises an SAP material and an aqueous fluid and wherein the SAP material comprises a reaction product of a reaction mixture comprising one or more viscosifying polymeric materials, one or more crosslinking agents, and water;
    allowing the SAP fluid to flow into at least a portion of the lost circulation zone;
    allowing the SAP material to absorb water and form a swollen SAP material, wherein the swollen SAP material blocks at least a portion of the lost circulation zone; and
    resuming drilling of the wellbore.

13. The method of claim 12, wherein the one or more crosslinking agents are independently selected from citric acid (CA), divinyl sulphone (DVS), or a combination thereof.

14. The method of claim 12, wherein the viscosifying polymer materials comprise one or more polysaccharides independently selected from hydroxyethyl tamarind, hydroxyl propyl tamarind, carboxymethyl tamarind, carboxymethyl hydroxyl propyl tamarind, or combinations thereof.

15. The method of claim 12, wherein the viscosifying polymer materials comprise one or more polysaccharides independently selected from carboxymethyl guar (CMG), hydroxypropyl guar (HPG), or a combination thereof.

16. The method of claim 15, wherein the one or more polysaccharides are CMG and HPG and the ratio of CMG to HPG in the reaction mixture is from about 1:1 to about 4:1 on weight basis, alternatively from about 2:1 to about 4:1, alternatively from about 2.8:1 to about 3.2:1.

17. The method of claim 12, wherein the one or more viscosifying polymeric materials are present in the reaction mixture in an amount of from about 1 wt. % to about 5 wt. %, based on the total weight of the reaction mixture.

18. The method of claim 12, wherein the one or more crosslinking agents are present in the reaction mixture in an amount of from about 0.001 wt. % to about 10 wt. %, based on the total weight of the reaction mixture.

19. The method of claim 12, wherein the ratio of the one or more crosslinking agents to the one or more viscosifying polymeric materials in the reaction mixture is from about 0.5:1 to about 5:1 on weight basis.

20. The method of claim 12, wherein the SAP material is CMG:HPG-CA, CMG:HPG-DVS, or both.

21. The method of claim 12, wherein the SAP material is at least partially encapsulated in a coating material.

22. The method of claim 12, wherein the one or more crosslinking agents comprise DVS, wherein the reaction mixture further comprises a pH adjuster or a catalyst.

23. A method of treating a subterranean formation penetrated by a wellbore, wherein the subterranean formation comprises one or more permeable zones, comprising:
introducing a superabsorbent polymer (SAP) fluid into the wellbore, wherein the SAP fluid comprises an aqueous fluid and an SAP material comprising a reaction product of a reaction mixture comprising one or more viscosifying polymeric materials, one or more crosslinking agents, and water;
allowing the SAP fluid to flow into at least a portion of the one or more permeable zones in the subterranean formation; and
allowing the SAP material to absorb water and form a swollen SAP material, wherein the swollen SAP material impedes fluid flow through at least a portion of the one or more permeable zones, wherein the SAP fluid further comprises a cementitious material.

* * * * *

UNITED STATES PATENT AND TRADEMARK OFFICE
CERTIFICATE OF CORRECTION

PATENT NO. : 11,091,681 B2
APPLICATION NO. : 16/670610
DATED : August 17, 2021
INVENTOR(S) : Nivika Rajendra Gupta et al.

Page 1 of 1

It is certified that error appears in the above-identified patent and that said Letters Patent is hereby corrected as shown below:

In the Claims

Claim 6, Column 24, Line 16, replace "or a combinations" with --or a combination--.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*